Dec. 22, 1970     L. D. BRYAN     3,548,535
TOY AIRCRAFT DEVICE
Filed Jan. 24, 1968     2 Sheets-Sheet 1
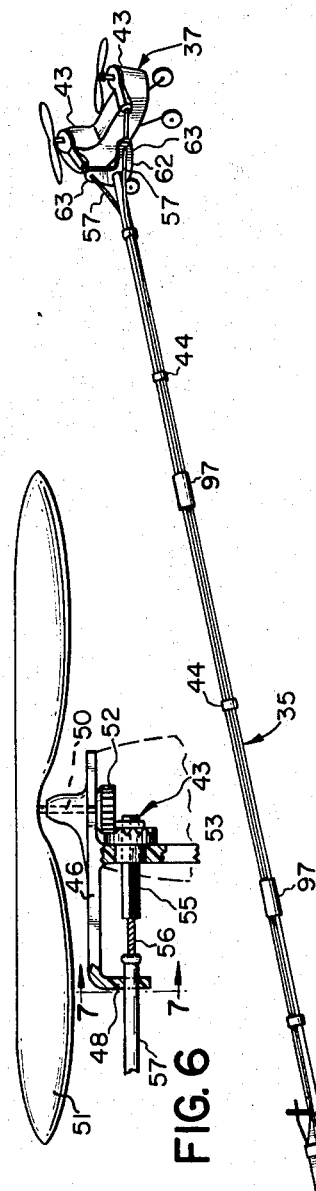
INVENTOR.
LELAND D. BRYAN
BY Gregory S. Dolgorukov
ATTORNEY

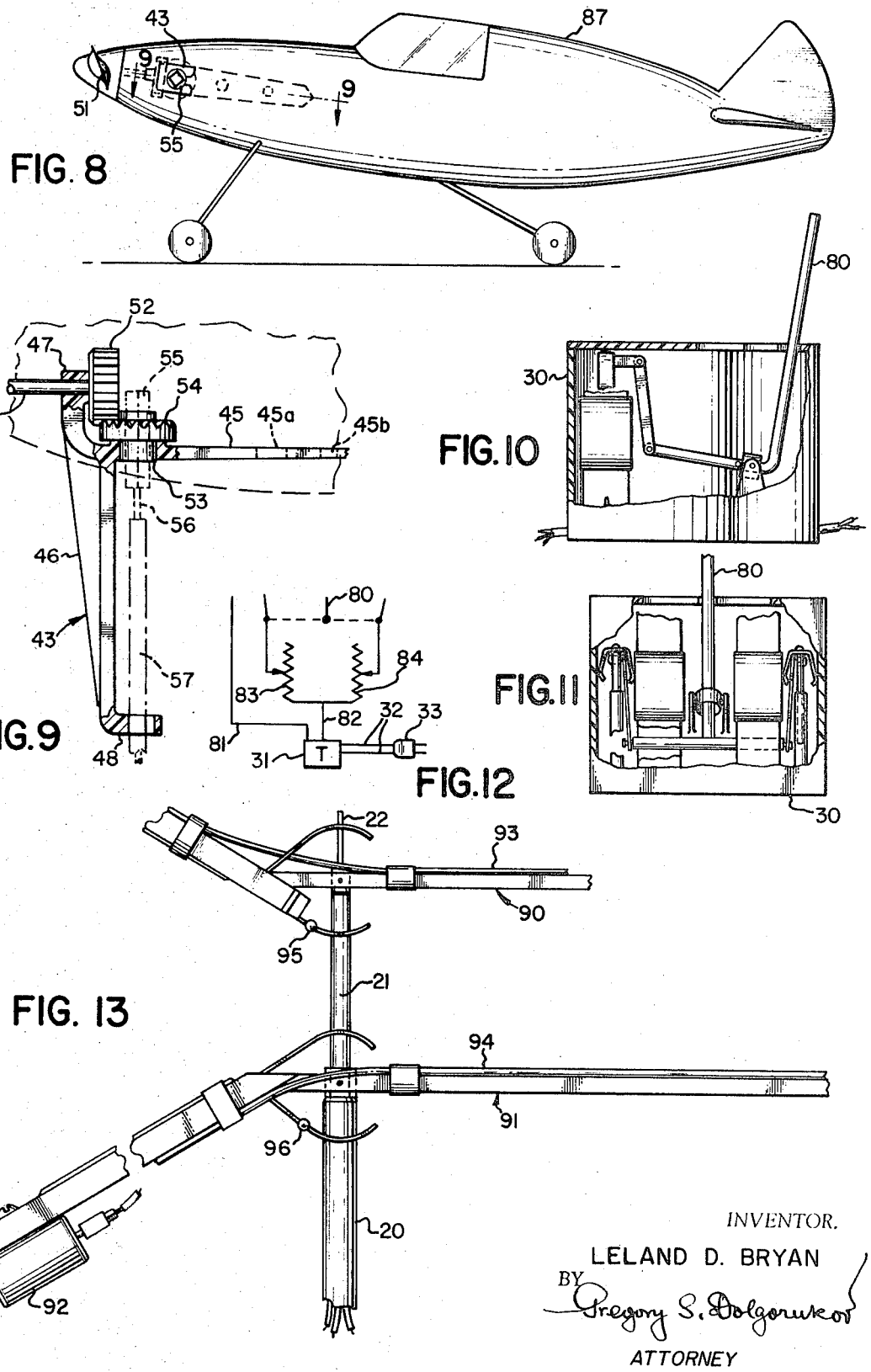

United States Patent Office 3,548,535
Patented Dec. 22, 1970

3,548,535
TOY AIRCRAFT DEVICE
Leland D. Bryan, 597 Skinner Road, Rte. 2,
Highland, Mich. 48031
Filed Jan. 24, 1968, Ser. No. 700,099
Int. Cl. A63h 27/04
U.S. Cl. 46—75
10 Claims

ABSTRACT OF THE DISCLOSURE

This application discloses a captive or tethered toy aircraft, such as airplane or helicopter, connected to one end of a boom mounted at the top of a pylon to rotate around such pylon and to rock in vertical planes. The power for operating the aircraft is in the form of one or more electric motors drivingly connected to the propeller or propellers of the aircraft. An important feature of the invention lies in the fact that no elcetric motors are provided either in the aircraft or in the pylon tower as was common in the prior constructions. Electric motors, one for each propeller, are mounted on the end of the boom opposite to the end carrying the aircraft, with such motors connected to the propellers by means of flexible shafts. The toy aircraft is so constructed with respect to its dynamic properties, that all operations of the craft result from such properties and from rotation of the propeller. Operation of the aircraft very closely resembles that of actual aircraft; by manipulating the amount of electric current impressed on the propeller operating motor, the toy aircraft is made to perform many maneuvers similar to those performed by actual aircraft. This provides challenge for the users to develop ability to control such aircraft in a manner causing it to perform operations not heretofore attainable in toy aircraft.

---

This invention relates to toy aircraft device, and more particularly to toy helicopter and airplane which operate by circling around a pylon member, but are free to change their speed, elevation, and in case of the helicopter also the direction of its travel.

Aircraft has provided a facinating subject matter to be reproduced in the form of toys for children. It was found, however, that reproducing the form, no matter how realistically, is not enough and that particular attraction is found in reproducing dynamic operations of the craft such as flying, climbing, and landing and, in general, reproducing as realistically as possible dynamic operation which a real aircraft can perform. The next phase of development came from the realization that with duplicating the crafts and their controls a factor of game and competition can be introduced in the use of such toys and making them still more attractive and interesting. However, the necessity of providing for such purposes the motive power to drive the crafts and conttrols enabling to reproduce maneuvering operations, all usually in a playroom of a house and, consequently, without objectionable smell, noise, etc., presented numerous problems of mechanical, electrical, electronic, hydraulic, pneumatic, etc., nature and required much ingenuity and technical skill. Numerous constructions of various kinds have been produced offering various degrees of success and advantages, but also having numerous problems of technical nature, and in some cases prohibitive cost for relatively moderate progress.

A particular disadvantage of many such toy aircraft devices or system is their complicated construction including many parts requiring precision manufacturing. This is particularly so with the system having driving means provided within the pylon tower as well as with the systems having engines or motors within the aircrafts themselves to drive the propeller or propellers thereof.

One of the objects of the present invention is to provide an improved toy aircraft system in which the above difficulties and disadvantages are overcome and largely eliminated.

Another object of the present invention is to provide a captive toy aircraft which performs in a most realistic manner the maneuvers of an actual aircraft and is propeller driven but has no motors or engines within the craft itself which would increase its weight and decrease its maneuverability.

A further object of the present invention is to provide an improved toy aircraft system which operates without noise, objectionable smell, and has aircraft of exceedingly light weight eliminating danger of heavy impacts and breakage of household items if operated in the room of a residential house.

A still further object of the present invention is to provide an improved toy aircraft system which may be electrically driven from the house lighting electric circuit.

A still further object of the present invention is to provide an improved toy aircraft system in which the craft is operated by a single stick electric control device, closely resembling the method of controlling actual aircraft.

A still further object of the present invention is to provide an improved toy aircraft system of the foregoing nature which is exceedingly simple in construction, is very light, can be easily set up, or disassembled for packaging and carrying, and the cost of which is only a fraction of the cost of conventional toy aircraft systems.

A still further object of the present invention is to provide an improved toy aircraft system in which the aircraft flies and maneuvers primarily in response to aerodynamic factors caused by the operation of the propeller of the craft and in response to such operation rather than by artificial reproduction of such maneuvers by means of various cords, linkages, and the like.

Still another object of the present invention is to provide an improved toy aircraft system in which the aircraft is in the form of a helicopter which responds to electric control and goes up, down, hovers, goes forwards and backwards, can pick up weights as well as drop or place the same on a predetermined spot.

A still fnrther object of the present invention is to provide an improved toy aircraft system in which two or more airplanes can be operated in competition responding to the skill of the operators.

A still further object of the present invention is to provide an improved toy aircraft system in which there is built-in an element of failure requiring skill to avoid the same, similarly to a sand trap on a golf course, thus adding element of game and competition in operating the toy system.

A still further object of the present invention is to provide a three-wire slip connection to pass the current to the electric motors carried by the boom or booms through a rotating and rocking joint.

It is an added object of the present invention to provide an improved toy aircraft device or system which is safe and dependable in operation, is not likely to become easily broken or disorganized, is easy to operate, and very inexpensive to manufacture and to service.

Further objects and advantages of this invention will be apparent from the following description and appended claims, reference being had to the accompanying drawings forming a part of this specification, wherein like reference characters designate corresponding parts in the several views.

FIG. 1 is a perspective view showing my improved toy aircraft system with the aircraft being in the form of a helicopter, together with the pylon tower and electric driving and control means therefor.

FIG. 2 is a perspective view showing the toy aircraft in the form of an airplane and illustrating the manner of supporting and driving the same.

FIG. 3 is a fragmentary elevational view showing the top of the pylon tower providing a slip joint or commutator cooperating with three electric wire brushes.

FIG. 4 is a fragmentary elevational view showing the short portion of the boom carrying two electric motors for operating a helicopter and mechanical and electrical connections of the boom to the pylon tower.

FIG. 5 is a fragmentary top view taken from above on the construction of FIG. 4.

FIG. 6 is a fragmentary view, partly in section, showing gear drive and propeller assembly and its connection to a craft of the helicopter type and to the flexible driving shafts thereof.

FIG. 7 is a fragmentary sectional view taken in the direction of the arrows on the section plane passing through the section line 7—7 of FIG. 6.

FIG. 8 is an elevational view showing the toy aircraft of the propeller driven airplane type and the manner of supporting such craft in flight and driving the same.

FIG. 9 is a fragmentary view, partly in section, showing gear drive and propeller assembly and the manner of connecting the same to an aircraft toy of airplane type.

FIG. 10 is a view partly in section showing the control box for the electric motors.

FIG. 11 is a view similar to FIG. 10 but taken with the observer looking from right to left.

FIG. 12 is an electric diagram illustrating the construction and operation of the control box.

FIG. 13 is an elevational view showing the top of the plyon tower and two booms, each carrying one motor on the short portion and one airplane on the end of the long portion (not shown).

It is to be understood that the invention is not limited in its application to the details of construction and arrangement of parts illustrated in the accompanying drawings by way of example, since the invention is capable of other embodiments and of being practiced or carried out in various ways within the scope of the claims. Also, it is to be understood that the phraseology and terminology employed herein is for the purpose of description and not of limitation.

In the drawings there is shown, by way of example, a toy aircraft device or system embodying the present invention. FIG. 1 illustrates a complete system including a pylon tower or member and a single boom carrying one toy helicopter. FIG. 13 shows use of the same pylon member for operating two airplanes, such as one shown in FIG. 8, carried by two separate booms. For such use, the single boom adapted for operating a helicopter is removed from the pylon tower and two separate booms are mounted on the pylon tower at the top thereof. It will be understood that more than one helicopter can be used by adding additional boom or booms, and that only one or more than two airplanes can be used by having one boom for each airplane.

Referring specifically to FIGS. 1–17, the system illustrated therein comprises a pylon tower or member generally designated by the numeral 15 and including a vertical standard 16, preferably of the tubular type; the standard 16 is connected, preferably in a detachable manner for convenience of packaging, to the disc-shaped base 16a. To the top of said standard 16 are connected three telescoping members 20, 21 and 22 made preferably of brass and electrically insulated from each other as indicated at 23 and 24. To said members 20, 21 and 22 are connected from the inside of the pylon member 16 electric wires 25, 26 and 27 connected to a control box 30 which, in turn, is connected by a two-wire connection to a transformer 31. The transformer 31 is connected by a two-wire connection 32 to a plug 33 adapted to be plugged into the house lighting circuit.

A boom, generally designated by the numeral 35, is connected to the pylon member 15 at the top thereof by a trunnion 36. The trunnion 36 is located on the boom 35 at such a locality that in operation, with the boom being loaded at both of its portions, it is in a substantially balanced condition and can rock on the trunnion 36 in vertically extending planes in response to the operation of the toy helicopter generally designated by the numeral 37 and connected to the end of the boom in a manner explained in detail below. In the present embodiment, the portion of the boom 35 carrying the helicopter 37 is a longer portion, while its shorter portion 38 carries two electric motors 40 and 41. The cross section of the boom may be in the form of a channel, in which case an elongated slot is provided in the bottom of the channel at the place of connection of the boom to the pylon in order to permit passage of the top portion of the pylon for rotation thereof around the vertical axis of the pylon and rocking on the trunnion 36. The boom may also be made of two separate side members, as in the present embodiment. The side members are spaced at a predetermined distance and are connected together at the short end of the boom by the plate such as 42 carrying the motors 40 and 41. Said separate members are connected at the longer end of the boom by clips 44.

An important feature of the present invention lies in the fact that in my improved system there is no power plant for driving the aircraft either in the aircraft itself or in the plyon tower. By virtue of such construction the exceedingly cumbersome, complicated, heavy, and expensive mechanisms for transmission of power to the propellers, common to many conventional constructions, are completely eliminated. In my improved system the electric motors are carried at the short end of the boom and therefore there is substantially a straight line path from the motors to the aircraft permitting exceedingly simple mechanism for transmission of power. Moreover, no special counterbalancing weight is needed, electric motors being used for such purpose.

A further feature of construction which made my improvements practicable is the gear drive to the propeller. The gear drive is made in the form of a self-sustaining standard unit or assembly which can be secured to any toy aircraft, helicopter, as well as airplane. Such units are illustrated in FIGS. 6 and 9. The gear drive unit, generally designated by the numeral 43, comprises generally an angular bracket having a flat arm 45 provided with holes such as 45a and 45b for passing of the connectors with which it is secured to the aircraft, and arm 46 extending perpendicularly to the arm 45 and having an extension 47 on one of its ends and a hook-like formation 48 on its other end. The extension 47 provides a bearing for the propeller shaft 50 carrying a propeller 51 at its outer end and a spur gear 52 at its inner end. The arm 45 provides a bearing for the hollow shaft 53 carrying a crown gear 54 meshing with said spur gear 52. The shaft 53 may be rather short and may be made integral with the gear 54, thus forming, in effect, axial extension of its hub. The shaft or hub extension 53 is provided with an axial hole of a square cross section, adapted to receive the end piece 55 soldered or otherwise secured to the end of a flexible shaft 56 operating within the housing 57 and drivingly connecting the gear 54 with the armature shaft of the respective motor 40 or 41 with the aid of a similar end piece 58 received in a square hole of a connector piece 59 soldered or otherwise secured to the armature shaft 60 of the motor such as 40.

The housing 57 of the flexible shaft 56 is supported by the boom and is held in place therein with the aid of the clips 44.

Two identical gear drive units with propellers are secured to the helicopter 37. To the end of the boom is secured a plate 62 having two horn-like extensions 63 through which are passed the ends of the flexible cable housing 57. The extremity of the said housing is passed through the hook-like extension 48 of the gear drive, respectively, and the end piece 55 secured to the end of the flexible shaft 56 is slipped into the square hole in the crown gear shaft. The construction connected to the other gear drive unit is similar. The above construction establishes mechanical driving connection to the propellers for operating the craft 37. It will be seen that such mechanical connection is extremely simple and light and that the helicopter 37 can be easily connected and disconnected from the system by removing the flexible shaft housing from the slot of the hook-like extension 48 and thereupon taking the end pieces 55 of the flexible shaft out of the hole in the shaft of the crown gears of the respective gear drives.

The electrical circuits terminate in the motors 40 and 41. The electric circuits interrupted in the pivot points at the top of the pylon tower are closed in a manner described below by means of wire brushes cooperating with the members 20, 21, and 22. A wire brush 70 connected with the aid of a suitable wire with one terminal of each of the two motors contacts the member 21 and therefore is common to both motors. Wire brushes 71 and 72 contact the members 20 and 22, respectively, and are connected with the aid of suitable wires with the second terminals of the motors 40 and 41, respectively. In operation, the electrical connection with the line circuit being established through a control box 30, both motors 40 and 41 begin operating. With equal current being impressed on the motors 40 and 41, the flexible shafts 56 will rotate at equal angular speed driving the propellers also at equal angular speeds. Under such conditions, the helicopter will rise straight up until the bumper 75 carried by the boom hits the pylon, or until the current is interrupted by the insulation piece 76 provided on the wire brush 70 touching the member 21 and interrupting the current to both motors. However, by decreasing the current to both motors with the aid of the control box 30, the helicopter can be made to descend or to hover at any point.

Should more current be impressed on one of the motors with the aid of the control box, the propeller driven from that motor will exert stronger upward force on the craft and will tilt it. In such tilted position, a horizontal component will be produced by the propeller and the boom will begin rotating. Impressing more curent on one motor or the other will cause the boom to rotate in one direction or the other. By combining such operations, it is possible to perform a large variety of maneuvers with the toy helicopter, similarly to actual craft. The toy helicopter can land, pick up weights with the aid of a hook which may be provided at the bottom of its construction, or deposit such weights at any desired locations reachable by the craft, to go in the circle determined by the length of the boom, in either direction, to climb, to descend, etc.

The above operation of the system is made possible with the aid of the control box 30 the construction of which is illustrated in FIGS. 10, 11, and 12. It is an important feature of the present construction that such control is attained with one stick only designated in said figures by the numeral 80. In said control box the two wires 81 and 82 coming out of the transformer are treated differently. The wire 81 is connected to the wire 25 in the pylon tower and is common to both motors, while the wire 82 is connected to two parallel variable resistances 83 and 84. The initial movement of the stick 80 through the center slot 85 (see FIG. 1) produces minimum operation speed of both motors, putting the system in operation. Thereupon, following the diverging wall 85 or 86 causes the movable contact operated by the stick to decrease resistances 83 or 84, allowing more or less current to go through one motor or the other, producing the above-explained operation.

My improved system can accommodate also a single propeller craft, such as a toy airplane, in which case only one electric motor and a simple rheostat are necessary. The airplane, such as one shown in FIG. 8 wherein it is designated by the numeral 87, is provided with a single propeller driving unit similar or identical to those used in a helicopter and shown in FIGS. 6 and 9. However, in the case of an airplane the unit is secured to the front of the airplane to have the propeller shaft extending horizontally. In cases of airplane toy craft, the propeller drive unit should be connected to the airplane body as far forward as practicable. Such installation is shown in FIG. 8.

It will now be seen in view of the foregoing that with the flexible shaft housing held in slot of extension 48 supporting the craft, the axis of the flexible shaft would represent the pivot point. With the craft left to itself, its tail portion would move down under its own weight, with the nose part of the craft pointing upwardly. Therefore, should the motor be operated with the craft being in such condition, the airplane would tend to climb. Should full power be applied to the motor suddenly, the craft would climb to its maximum height in only a portion of the circle. However, if the power is applied gradually, even a slight forward movement of the airplane would produce rearward force on the tail portion of the plane, causing the plane to rotate around the axis of the flexible shaft and begin to move toward a more horizontal position. The weight of the airplane body is very small. Therefore, unaffected by other forces, the body of the airplane would assume horizontal position exceedingly fast and climbing would be possible only at very low forward speed of the airplane. However, operation of the gear drive produces a reactive torque aiding the weight of the airplane in moving its tail portion downward, thus preserving the climbing ability of the toy craft.

It should be understood that in my improved system the craft is made of exceedingly light weight material, such as plastic foam in order to eliminate the danger of breakage of the toy craft and of the household articles in case of an impact. With the toy devices intended to be operated in homes, this feature is of importance.

FIG. 13 illustrates the top of the pylon tower and the two booms connected thereto for operating two airplanes. For the purpose of such conversion, the two-motor boom, such as 35 in the cnstruction of FIG. 1, is removed and two single-motor booms 90 and 91 are installed at the top of the pylon. Each boom carries a single motor, such as 92 carried by the boom 91, and has only a single flexible shaft such as 93 and 94, respectively. In this case each boom has two wire brushes as shown, and it is desirable that the section 21 be extended upwardly to prevent brushes bearing thereon and the booms interfering with each other. Pieces of insulation material such as 95 and 96 are connected to one or both brushes of each boom to limit the angular movements of the booms by interrupting the flow of current to the respective motor. Provision of such an expedient both in the construction of FIG. 13 and the construction of FIG. 1 is intended to add the element of game or competition to the operation of the toy, requiring operating the system in such a manner as to prevent excessive climbing. If the participant is not skilled enough to operate the craft holding it below the limit of its elevation, should the craft reach such elevation, the power is switched off automatically, and the craft is delayed in its forward motion. Such a failure of the participant may be reflected in any desired manner in the game score.

It has been shown that the skill in operating various toy crafts connected to my improved system is developed very fast, even by children. The crafts having exceedingly small momentum on an impact do not become easily damaged or cause damage in the house. They operate quietly and do not produce objectionable smell. Operating the craft electrically from house lighting circuit is an important advantage permitting the craft to be operated for hours at a time. However, if desired, other sources of electric current such as batteries, may be used under some conditions. The system can be set up and disassembled for packaging or carrying in a very simple manner. Its manufacturing is exceedingly simple and inexpensive.

The boom may also be made separable into several sections for convenience of more compact packaging and connectable by slip couplings such as 97.

By virtue of the above-disclosed construction the objects of the invention listed above and numerous additional advantages are attained.

I claim:

1. In a captive aircraft toy device, a pylon free of having any electric motors therein, a boom hingedly suspended intermediately its ends near the top of said pylon at a point to produce a substantially balanced condition, said suspension providing for rocking of said boom in vertically extending planes and for rotation around said point of suspension and said pylon, a single electric motor mounted on one end of said boom, a toy aircraft mounted on the other end of said boom and including one drive-and-propeller assembly detachably secured as a unit to said aircraft and including a shaft rigid throughout its entire length and having a propeller mounted on its front end and a spur gear mounted on its rear end to provide for longitudinal sliding to absorb shocks on the propeller, a flexible shaft having one end connected to said motor for rotation with its other end drivingly connected to said assembly to drive the same and the propeller thereof, with said boom being adapted to rotate around said pylon and in the vertical planes solely in response of rotation of said propeller driven by said electric motor.

2. In a captive aircraft toy device, a pylon free of having any electric motors therein, a boom hingedly suspended intermediately its ends near the top of said pylon at a point to produce a substantially balanced condition, said suspension providing for rocking of said boom in vertically extending planes and for rotation around said point of suspension and said pylon, a single electric motor mounted on one end of said boom, a flexible shaft supported by said boom and having one end drivingly connected to said motor and its other end extending beyond said boom, a toy airplane having wings and a tail, a bracket separably connected as a unit to said airplane at the front thereof and ahead of its wings and providing bearings for two shafts extending at an angle to each other, one of said shafts having an outer end carrying a propeller and an inner end drivingly connected to the end of said flexible shaft ahead of its wings for driving said propeller, with rotation of said boom and operation of said airplane resulting solely from built-in dynamic qualities of said airplane and rotation of said propeller.

3. The construction defined in claim 2 with the built-in dynamic properties of the toy airplane being so selected that at medium speeds of its propeller and gradually applied the airplane proceeds on a substantially level flight but climbs higher and higher as the speed of the propeller increases, because of the force of reactive torque acting to press the tail down.

4. The construction defined in claim 2 with the built-in dynamic properties and the weights of portions of the airplane so selected that at low speeds of the propeller the airplane's tail tends to go down and its nose point upwardly and with the airplane tending to climb if the increased low power is applied to the propeller, but leveling out if medium power is gradually applied due to the force of the air resistance acting to raise the tail.

5. A captive aircraft toy device comprising a pylon, a boom hingedly suspended intermediately its ends near the top of said pylon at a point to produce a substantially balanced condition, said suspension providing for rocking of said boom in vertically extending planes and for rotating around said pylon, a toy aircraft operatively arranged at one end of said boom and connected thereto to exert a force on said boom capable of rotating the same around said pylon, said aircraft having at least one propeller provided thereon to exert a pulling force on the aircraft, an electric motor carried by said boom on the end thereof opposite to the end carrying the aircraft, and a flexible shaft driving connection between said motor and said aircraft for rotating said propeller of the aircraft, said connection including one flexible shaft for each propeller of said aircraft, with said aircraft being the only component exerting a moving force on said boom and only in response to its built-in dynamic characteristic and rotation of the propeller thereof.

6. The construction defined in claim 5, with the aircraft being a toy helicopter having two propellers operated by two separate flexible cables driven by two electric motors carried by the opposite end of said boom.

7. The construction defined in claim 6, with said helicopter being supported by the ends of said flexible shafts, in turn supported by said boom, and including electric control means comprising a plug adapted to be plugged into a house lighting circuit and including two wires, with one of the wires being common to both motors, and the second wire being divided into two parallel wires, each provided with resistance to provide two separate wires one for each motor, and a single stick to control said resistances jointly and separately to maneuver the toy craft.

8. The construction defined in claim 2, with the toy airplane connected to the flexible shaft at the front thereof to produce, when the propeller is rotated, a torque force tending to press the tail of the airplane downwardly, with such torque to be counterbalanced by the tendency of the tail to rise in the forward movement of the airplane.

9. The construction defined in claim 8, there being a plurality of similar booms mounted on one pylon, each boom having a toy airplane connected to its end and electric brush means adapted to make said electric motors inoperative when either of said booms assumes a predetermined angular position.

10. In a captive aircraft toy device, a pylon, a boom suspended intermediately its ends near the top of said pylon at a point to produce a substantially balanced condition, said suspension providing for rocking of said boom in vertically extending planes and rotation around said point of suspension, two electric motors mounted on one end of said boom, a toy helicopter separately mounted at the other end of said boom and including two propellers, each propeller mounted to produce vertical pull when operated, two flexible shafts drivingly connecting each of said motors with said propellers, respectively, an electric resistance means adapted to regulate the amount of electric current impressed on each of said motors to maneuver said helicopter, and including electric control means comprising a plug adapted to be plugged into a house lighting circuit and including two wires, with one of the wires being common to both motors, and the second wire being divided into two parallel wires, each provided with resistance to provide two separate wires, one for each motor, and a single stick to control said resistance jointly and separately to maneuver the craft, with the pylon including two co-axial tube members provided at its top and electrically insulated from each other, and each connected to one of said wires, respectively, with the boom carrying three wire electrical brushes, with one brush contacting the tube member connected to the common wire, and the other two brushes contacting the tube electrically connected to each of said motors, respectively, with the common brush carrying a piece of electrical insulation adapted to contact the tube and interrupt the current to both motors when the helicopter reaches a predetermined elevation.

References Cited

UNITED STATES PATENTS

| | | | |
|---|---|---|---|
| 2,756,537 | 7/1956 | Ernst | 46—77 |
| 2,967,706 | 1/1961 | Pettit | 46—77X |
| 3,119,611 | 1/1964 | Bennett | 272—31 |

LOUIS G. MANCENE, Primary Examiner

R. F. CUTTING, Assistant Examiner

U.S. Cl. X.R.

46—77, 78